United States Patent [19]
Höss et al.

[11] Patent Number: 5,633,642
[45] Date of Patent: May 27, 1997

[54] RADAR METHOD AND DEVICE FOR CARRYING OUT THE METHOD

[75] Inventors: Alfred Höss, Hamberg; Wolfgang Schindler, Regensburg, both of Germany

[73] Assignee: Siemens Aktiengesellschaft, Munich, Germany

[21] Appl. No.: 651,564

[22] Filed: May 22, 1996

Related U.S. Application Data

[63] Continuation of PCT/DE94/01382, Nov. 23, 1994.
[51] Int. Cl.[6] .................................................. G01S 13/93
[52] U.S. Cl. .................................. 342/70; 342/71
[58] Field of Search ................................ 342/70, 71, 72, 342/196

[56] References Cited

U.S. PATENT DOCUMENTS

| | | | |
|---|---|---|---|
| 4,901,083 | 2/1990 | May et al. | 342/128 |
| 5,134,411 | 7/1992 | Adler | 342/130 |
| 5,302,956 | 4/1994 | Asbury et al. | 342/70 |
| 5,402,129 | 3/1995 | Gellner et al. | 342/70 |
| 5,517,196 | 5/1996 | Pakett et al. | 342/70 |
| 5,530,447 | 6/1996 | Henderson et al. | 342/70 |

FOREIGN PATENT DOCUMENTS

| | | |
|---|---|---|
| 0 544 468 A2 | 6/1993 | European Pat. Off. |
| 25 14 868 | 10/1976 | Germany . |
| 29 00 825 | 7/1980 | Germany . |
| 40 40 572 A1 | 6/1992 | Germany . |
| 2 172 461 | 9/1986 | United Kingdom . |
| 95/12824 | 5/1995 | WIPO . |

Primary Examiner—John B. Sotomayor
Attorney, Agent, or Firm—Herbert L. Lerner; Laurence A. Greenberg

[57] ABSTRACT

A radar method and a device for carrying out the method include estimating an azimuth angle of each target object from determined variables of distance or range, relative speed and relative acceleration after Kalman filtering and separating out target objects having a physically impossible behavior (tracking and prediction). That is used to determine which target objects are located on a roadway occupied by a vehicle and which are the most dangerous thereof. Indication, warning or action thresholds are determined as a function of driving behavior of the driver, road conditions and weather conditions. Indication, warning or action signals (in the brakes, throttle valve or gear shift of the vehicle) result if the thresholds are exceeded or undershot by the range, the relative speed and the relative acceleration.

25 Claims, 3 Drawing Sheets

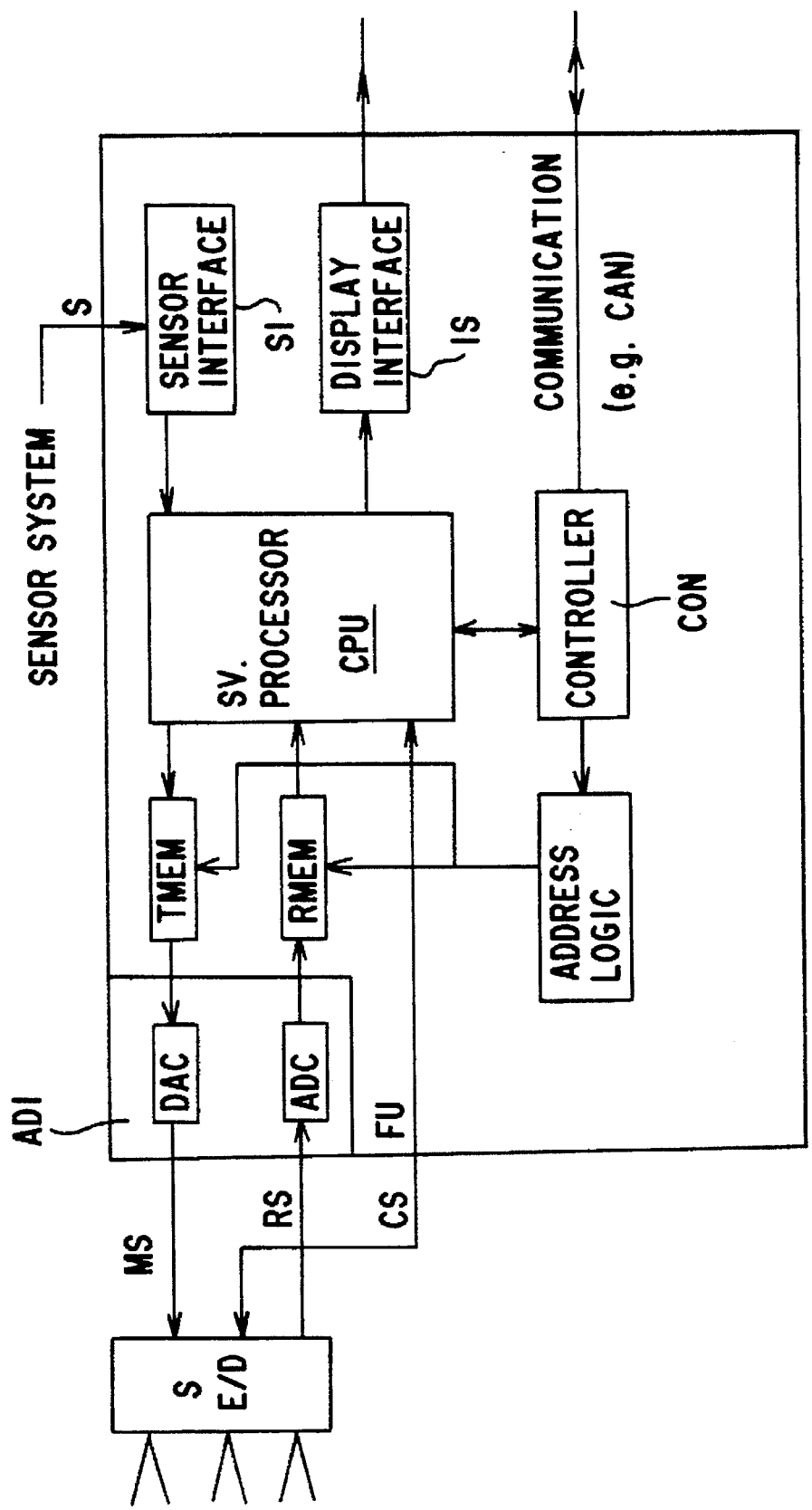

5,633,642

RADAR METHOD AND DEVICE FOR CARRYING OUT THE METHOD

CROSS-REFERENCE TO RELATED APPLICATION

This application is a continuation of International application Ser. No. PCT/DE94/01382, filed Nov. 23, 1994.

BACKGROUND OF THE INVENTION

Field of the Invention

The invention relates to a radar method, in particular for road vehicles, having at least one radar beam, in which digitized and recorded samples that are received during two modulation phases in each modulation cycle of mixed signals formed from transmitted and received signals are subjected separately to a fast Fourier transformation in successive measurement cycles per radar beam, each measurement cycle includes a modulation cycle formed from a rising and a falling modulation phase of the radar signal and a subsequent evaluation pause for the received echo signals, in a digital signal processor, in order to determine object frequencies which are assigned to the target objects, per measurement cycle from the maxima contained in the frequency spectra derived therefrom, object tracks are formed from the object frequencies which are stored over a number of measurement cycles for each target object and separated according to rising and falling modulation phases, the object tracks describing a previous time-domain behavior of the object frequencies, estimated values for the object frequencies to be expected in the next measurement cycle are formed from the previous behavior of the object tracks, and the object frequency pairs which have the respectively smallest error are assigned to one another after calculation of an error from the object frequencies and from estimated values obtained from the object tracks, and correct values for distance and relative speed of at least one target object are calculated from the pairs.

The invention also relates to a device for carrying out the method, including a digital signal processor which produces triangular-waveform digital modulation signals that are converted in a D/A converter of an interface module into analog signals and are processed in a radar front end to form modulated radar signals that are transmitted and received by at least one antenna, and a mixing and filtering device for the production of mixed signals from the transmitted and received signals which are converted in an A/D converter of the interface module into digital signals and are supplied to the signal processor for further processing.

Such a radar method, in particular for road vehicles, and a device (radar set) for carrying out that method are described in Published International Patent Application PCT/EP94/03646 (referred to below as the "previous method"), which has a later publication date than the effective filing date of the instant application, but forms the basis of the present invention. That device is a cost-effective FMCW radar set having a digital signal processor which controls at least one antenna through an oscillator and produces a mixed signal from transmitted and received signals which are modulated with a triangular waveform. The mixed signal is subjected to fast Fourier transform in each modulation phase (up or down) of each measurement cycle in order to obtain object frequencies from the determined maxima which are assigned to each target object, from which object tracks are formed that extend back over a plurality of measurement cycles and are used to form estimated values for the measurements which can be expected in the next measurement cycle at the object frequencies. The mutually associated object frequencies fu=|fr−fv| and fd=|fr+fv| of both modulation phases of a measurement cycle are determined, and the distance e~|fu+fd| and relative speed vr~|fu−fd| of each target object are determined from them in a known manner.

FMCW radar methods are generally known, for example from:

The publication by E. Baur, entitled: Einführung in die Radartechnik/Studienskripten [Introduction to Radar Technology/Study Scripts], Teubner, 1st Edition, Stuttgart 1985, pages 124 to 133;

German Published, Non-Prosecuted Application DE 25 14 858 A1;

German Published, Non-Prosecuted Application DE 29 00 825 A1; and

German Published, Non-Prosecuted Application DE 40 40 572 A1.

SUMMARY OF THE INVENTION

It is accordingly an object of the invention to provide a radar method and a device for carrying out the method, which overcome the hereinafore-mentioned disadvantages of the heretofore-known methods and devices of this general type and which further improve the method and device according to German Published, Non-Prosecuted Application DE 29 00 825 A1.

With the foregoing and other objects in view there is provided, in accordance with the invention, a radar method for vehicles employing at least one radar beam, which comprises determining object frequencies assigned to target objects per measurement cycle from maxima contained in a frequency spectra derived from the object frequencies in a digital signal processor, by separately subjecting digitized and recorded samples received during two modulation phases in each modulation cycle of mixed signals formed from transmitted and received signals to a fast Fourier transformation in successive measurement cycles per radar beam, and including a modulation cycle formed from a rising and a falling modulation phase of the radar signal and a subsequent evaluation pause for received echo signals in each measurement cycle, storing the object frequencies over a number of measurement cycles, forming object tracks separated according to rising and falling modulation phases from the stored object frequencies for each target object, describing a previous time-domain behavior of the object frequencies with the object tracks, forming estimated values for the object frequencies to be expected in the next measurement cycle from a previous behavior of the object tracks, calculating an error from the object frequencies and from the estimated values obtained from the object tracks, assigning object frequency pairs having the respectively smallest error to one another after the calculation of the error, and calculating correct values for a distance and a relative speed of at least one target object from the pairs, determining and storing a data set containing distance and relative speed data for at least one target object, filtering the distance and relative speed data, such as with Kalman filtering, α-β filtering or α-β-γ filtering, determining a turn radius and a speed of the vehicle, determining which target objects are located in a lane occupied by the vehicle by using the distance and the relative speed of the target object, as well as the speed and turn radius of the vehicle, and determining at least the most dangerous target object therefrom, and alerting a driver of the vehicle if a predetermined indication threshold for the distance and the relative speed is exceeded or undershot.

With the objects of the invention view there is also provided, in accordance with the invention, a radar device for vehicles employing at least one radar beam, comprising a digital signal processor producing triangular-waveform digital modulation signals; an interface module having a D/A converter converting the digital modulation signals into analog signals; a radar front end processing the analog signals to form modulated radar signals; at least one antenna transmitting and receiving the modulated radar signals; a mixing and filtering device for producing mixed signals from the transmitted and received signals; the interface module having an A/D converter converting the mixed signals into digital signals and supplying the digital signals to the signal processor for further processing; a sensor interface for supplying signals to the signal processor; an interface unit for supplying control signals from the signal processor to other units of the vehicle; a control line connected from the signal processor to the radar front end for carrying digital control signals from the signal processor to control the at least one transmitting and receiving antenna; and a visual or audible indication or warning device being controlled by control signals from the signal processor.

Other features which are considered as characteristic for the invention are set forth in the appended claims.

Although the invention is illustrated and described herein as embodied in a radar method and a device for carrying out the method, it is nevertheless not intended to be limited to the details shown, since various modifications and structural changes may be made therein without departing from the spirit of the invention and within the scope and distance of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is an alternative block circuit diagram of the radar set.

DESCRIPTION OF THE PREFERRED EMBODIMENTS

Figure 1:
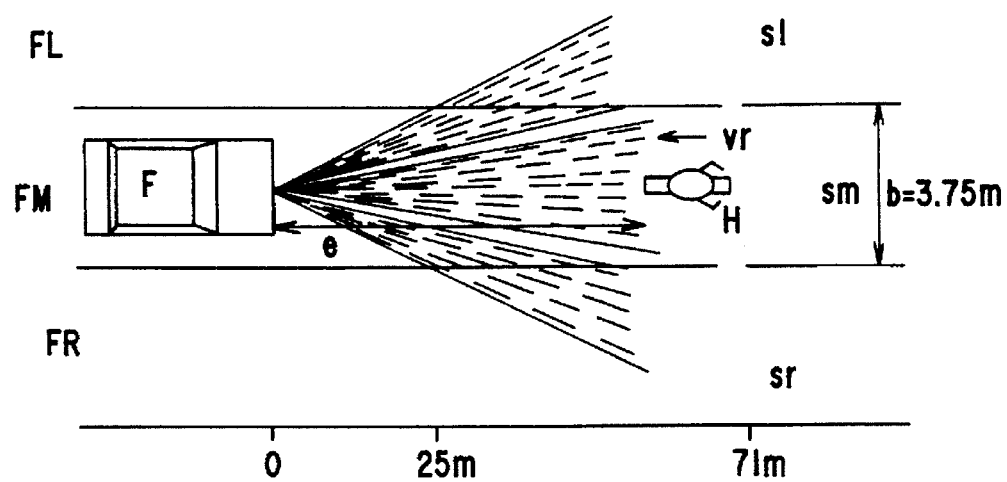
FIG. 1 is a diagrammatic, top-plan view of a vehicle on a three-lane roadway.

Referring now to the figures of the drawings in detail and first, particularly, to FIG. 1 thereof, there is seen an exemplary embodiment that shows a vehicle F, which is equipped with a radar set, while it is being driven on a center lane FM of a roadway FR, FM, FL that has three lanes in the direction of travel. In this case, each lane is, for example, 3.75 m wide. The radar set has three radar beams st, sm, sl which point forwards and have beam directions that are somewhat offset laterally with respect to one another. In the example shown, the three-beam system paints the whole of one's own lane FM at a distance which is approximately 25 m. For example, at a distance of around 70 m, each of the three beams covers approximately the full width of one lane in each case: the beam sm covers one's own lane FM, and the side beams sl, sr cover the right-hand and left-hand adjacent lanes FR and FL.

All three lanes are selectively monitored at the same time in an important distance zone. The beam width in the vertical direction is approximately 5°, for example, in order to avoid loosing objects H which are moving in front through dips in the road or over hilltops. In the examples shown, the minimum distance of the radar set is, for example, approximately 1 m, and the maximum distance is, for example, around 150 m, although FIG. 1 shows only a distance of approximately 75 m in each case for the three beams sr, sm, sl.

Figure 2:
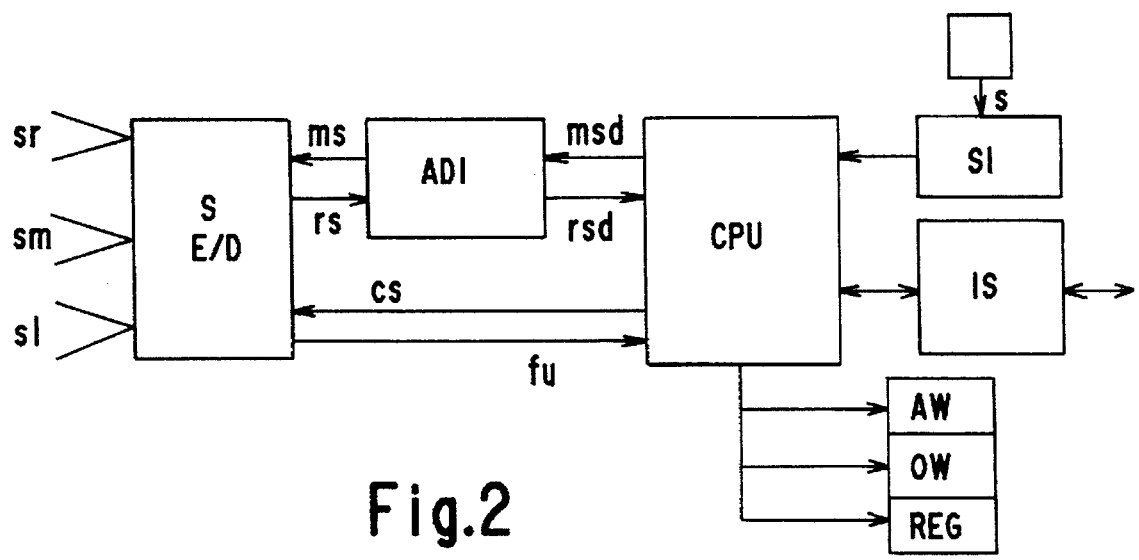
FIG. 2 is a block circuit diagram of a radar set.

The radar set according to FIG. 2 is used to determine a distance or range e and a relative speed vr between the moving vehicle F and objects H moving in front. It should be noted that the relative speed vr is negative when the distance e between the vehicle and the object H is reducing.

In the case of a specific exemplary embodiment of an FMCW radar method and set according to the invention (FIGS. 1 and 2) having three radar beams sm, st, sl which are offset with respect to one another and are transmitted cyclically and successively:

* the width of each individual one of the three beams is 3.0°±0.5° horizontally and 5.0°±1.0° vertically;

* the angle between the centers of adjacent lobes is 3.3°±0.5°;

* the minimum distance is approximately 1 m;

* the maximum distance is approximately 200 m;

* the accuracy of the calculated object distances is<±1 m;

* and the speed resolution is <±2.7 km/h;

* at a carrier frequency of 77 GHz and a modulation shift of 200 MHz, each of which is passed through in approximately 3 ms per modulation phase, with a measurement cycle duration of approximately 13 ms.

Even better suppression of false alarms can be achieved by using a radar having, for example, five beams without any more stringent process requirements, with five beams ll (left outer), l (left), m (center), r (right), rr (right outer) being transmitted and received cyclically, for example in the sequence m-ll-rr-m-l-r etc.

A digital signal processor CPU transmits a digital modulation signal msd which is converted in a D/A converter of an interface module ADI to form an analog, triangular-waveform modulation signal ms, and is-supplied to a transmitter S. The transmitter S is used to transmit modulated radar beams sm, sr, sl.

Echo signals rs received by a receiver E are passed, after being digitized in an A/D converter of the interface module ADI, as digital data rsd to the signal processor CPU and are processed therein in accordance with the above-mentioned method to form the variables distance e and the relative speed vr for each target object. The signal processor CPU carries out all of the calculations for the method, in particular fast digital Fourier transformations FFT as well, in accordance with the previously known method for determination of the maxima contained in the spectra derived therefrom and of object frequencies fu and fd assigned thereto. These spectra contain noise elements from which, according to the invention, mean values are formed that are subtracted from the amplitudes of this spectrum. A limit which is above the remaining noise signal is subsequently found, so that all those maxima of the spectra which are above this limit can be assessed as maxima assigned to a target object and not as noise levels.

The signal processor CPU can additionally receive data, for example, from a sensor interface SI, through the use of signals s from sensors SE of a higher-level system in the vehicle F, for example data relating to the current speed of travel of the vehicle F and relating to the steering angle of its steerable front wheels and their wheel rotation speeds. Through further sensors or switches which can be operated by the driver and the sensor interface SI, the signal processor CPU can, for example, also interrogate other state data relating to the lane FM, such as whether it is wet or dry etc., as well as weather conditions and visibility conditions or other data in order to take them into account as well in the evaluation of received radar echoes and in the determination of indication and warning thresholds, or else in an automatic determination of a braking distance and in an assessment as to how dangerous a detected target object H is.

In addition, the signal processor CPU can be connected through an interface unit IS to other units in the vehicle F (for example to the brakes or the throttle valve in order to reduce or increase the speed of the vehicle F automatically if the calculated distance increases or reduces too sharply or in the event of an excessive change in the relative speed with respect to the target object moving in front, for automatically controlled driving in columns of traffic).

The signal processor CPU can, in addition, send digital control signals cs directly to the transmitter or to the receiver. The control signals cs can be used, for example, to switch over from one radar beam to the other beams. Signals fu, for example fault messages, messages about dirt on the transmitting/receiving antenna (=request for automatic or manual cleaning of the radar antenna cover), etc., for example, can likewise be reported directly to the signal processor CPU from the transmitter S or from the receiver E, or from sensors assigned to them.

Following an evaluation, the signal processor CPU can initiate signals, which are assigned at least individually to the detected target objects H, through a visual or audible warning device OW, AW. In addition, information about such objects H can be overlaid, for example by reflecting it on the front windshield. Specific data can also be recorded in a unit REG, for example in an accident data recorder.

If the storage of the received echo signals and their processing are carried out cyclically and successively in the same signal processor, fast and thus high-cost processors are required. In order to allow more cost-effective processors to be used it is possible, as is illustrated in FIG. 5, for the buffer storage of the received radar echo signals rsd to be carried out in the same way as that of the modulation signals msd, which are output from the signal processor, in buffer memories RMEM, TMEM, and for the data processing to be carried out in the signal processor CPU (slave) the load on which is relieved by a controller CON (master) for data recording, transfer to the higher-level system, transfer of control data, triggering of the address logic (start of the measurement cycle), the address logic itself and, if required, control of the transmitting/receiving system and of the display interface as well.

In addition, the controller CON and the signal processor CPU can monitor one another and the controller can take over control of the self-diagnosis of the radar set, as will be explained below.

By using two processors, the data evaluation of the data recorded in the preceding measurement cycle may amount to virtually the entire duration of a measurement cycle, reduced only by a short transmission period for the data from the buffer memory to the processing processor. Although the separation results in a somewhat greater hardware cost as a result of the additional buffer memories and the further controller, the stringent requirements on the processing processor (digital signal processor) are, however, reduced. In addition, with the same computation power, this allows the implementation of other, additional functions such as distance warning and intelligent vehicle speed control, etc.

Figure 3:
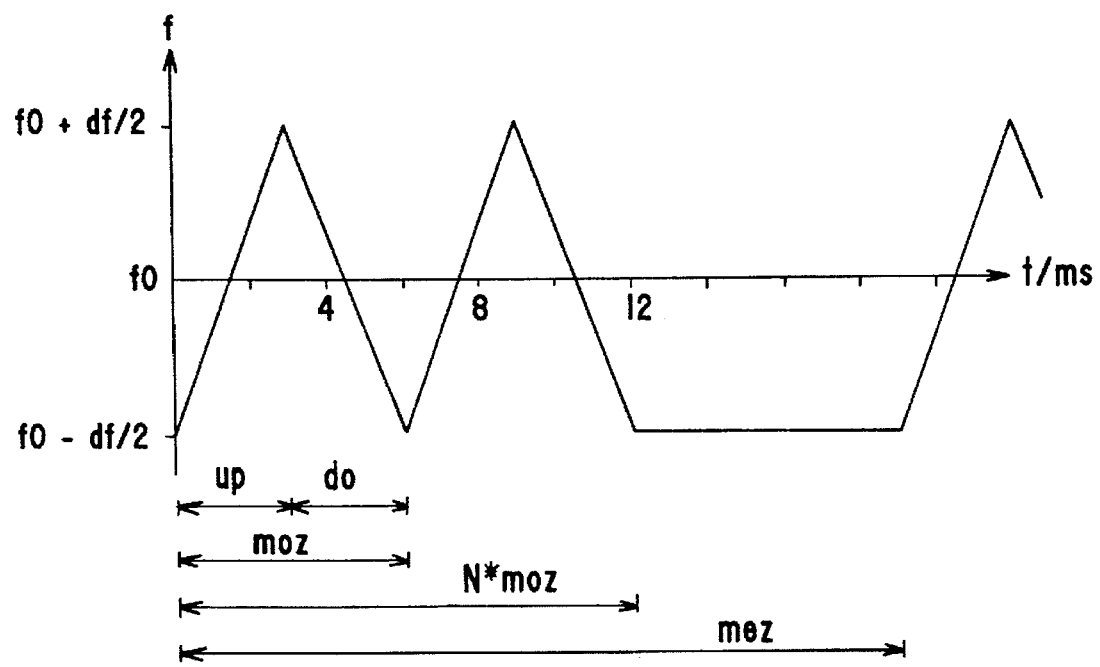
FIG. 3 is a diagram showing an example of two identical modulation cycles per measurement phase.
Figure 4:
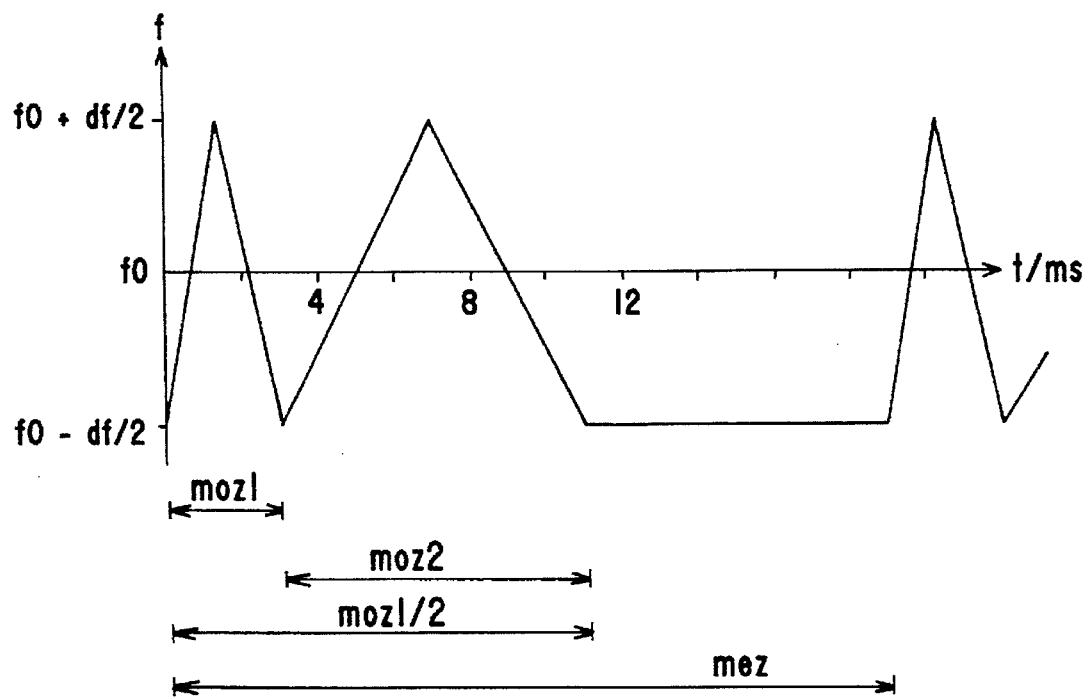
FIG. 4 is a diagram showing an example of two different modulation cycles per measurement phase.

According to the previously known method, an individual measurement cycle mez per radar beam includes a single modulation cycle and, subsequent thereto, an evaluation pause. However, according to the invention, it can also include a plurality of such successive modulation cycles moz, for example three or five modulation cycles. The individual modulation cycles moz can have different durations and different edge gradients in the frequency/time graph, as is seen in FIGS. 3 and 4. By way of example, it was assumed in these figures that the modulation shifts for the upward modulation phase up and for the downward modulation phase do are constant in each case.

The signal waveform according to FIG. 4 having different modulation durations moz1, moz2 additionally allows image frequencies (if the modulation rates df/dt are slow, negative frequencies fv can in theoretical computation terms occur in the formula $fd=|fr-fv|$; the negative frequencies, imaged as positive frequencies, cause ambiguities) to be eliminated by measurements being carried out using a faster modulation cycle moz1 in the near-field zone (for example, preferably 0 m to 40 m) in which such image frequencies can occur with slow modulation cycles, with the faster modulation cycle moz1 having, for example, a rise time of 0.75 ms (as a result of which the frequencies fr and fv are shifted upwards and negative frequencies fv do not occur), while a slower rise time of, for example, 3 ms is used to measure the far-field zone. Ambiguities caused by image frequencies can be eliminated in the slow modulation cycles moz2 for the near-field zone using the information obtained in the faster modulation cycle in the near-field zone.

In the case of a plurality of modulation cycles per measurement cycle, a mean value of the corresponding values of all n modulation cycles of this measurement cycle is used to form the object frequencies fu and fd, as is seen in the previously known method.

The values determined in this way for the distance e and the relative speed vr of each target object H form the "raw data" for the rest of the method procedure.

A data set for each target object contains at least the following parameters which, if they are not constant, are updated after each measurement cycle and, if they are not yet known, are explained below:

distance, relative speed, relative acceleration, amplitude (of the associated maxima in the FFT spectrum), chosen safety distance, tracking time or tracking counter, prediction time or prediction counter as well as object status (for example, a target object detected but not yet reliably valid, valid, dangerous, less dangerous, not dangerous).

The tracking time or the tracking counter of a target object represents a measure of the preceding tracking duration (in time or the number of measurement cycles), although this can be limited.

The prediction time or the prediction counter characterizes the duration of the prognosis (in time or number of measurement cycles) relating to the further behavior of the object being tracked. The object can, for example, appear to disappear temporarily for the radar system, for example as a result of screening (by another large object moving closely in front of the vehicle F), and is therefore no longer being detected (for a number of measurement cycles), but is predicted. The prediction time or prediction counter can likewise be limited.

The distance e, relative speed vr and relative acceleration br of the detected target objects H are subsequently supplied to a Kalman filter which is known per se (or $\alpha$-$\beta$ or $\alpha$-$\beta$-$\gamma$ filters which are likewise known), and are filtered (cleaned up).

Target object tracks are then likewise formed by using the cleaned-up data e, vr and br for each target object H, in an analogous manner to the formation of the tracks at the object frequencies fu and fd in the case of the previously known method, and the target objects are continuously tracked over a predetermined time period (tracking), are checked for physically possible behavior and, in the absence of measurement data for a predetermined time period, estimated values are formed on the basis of the previous behavior (prediction). If a target object does not appear again after the prediction time has elapsed, or behaves in a "physically impossible" manner, the corresponding data set is deleted.

The azimuth angle (horizontal offset from the longitudinal axis of the vehicle) is estimated from the cleaned-up data and from amplitudes of the object frequencies and beam number (in the case of three beams: center, left, right), and the tracked targets are weighted in a low-noise manner, in a particularly simple, less complex way.

Known mathematical and geometric relationships are used to find, at least from the target object data, the distance e, relative speed vr, acceleration br and azimuth angle as well as the speed and turn radius of one's own vehicle, which target objects are located in one's own lane, and the critical target objects and the most dangerous target object on one's own lane is determined.

In a further step, the driving style is deduced adaptively from the steering movements (d/dt), accelerations and braking decelerations initiated by the driver. Indication, warning and, if required, action thresholds for the distance e, relative speed vr and acceleration br are formed on the basis of this driving style. The data relating to the most dangerous target objects are compared with the thresholds. If these thresholds are exceeded or undershot, appropriate indications or warning signals are initiated and/or braking, an engine throttle valve operation or a gearshifting operation occur.

At the start of the method according to the invention, the radar set is first initialized by deleting all of the stored data sets (which relate to target objects that were being tracked before the radar set was last turned off). The initialization routine can additionally check the serviceability of the radar set: it can, for example, use the magnitude of the noise level and radar signals (comparison with predetermined limits) to check the operation of the front end (analog section) of the radar, it can pass a simulated object to the receiving antenna input and check the correctness of the processing of the simulated signal. In addition, if defective operation occurs, it can indicate this defective operation to the driver through a warning lamp or can request or automatically initiate cleaning of the radar antenna cover if it is dirty. This is advantageous if the serviceability of the radar set is also checked at regular intervals during operation.

We claim:

1. A radar method for vehicles employing at least one radar beam, which comprises:

determining object frequencies assigned to target objects per measurement cycle from maxima contained in a frequency spectra derived from the object frequencies in a digital signal processor, by:

separately subjecting digitized and recorded samples received during two modulation phases in each modulation cycle of mixed signals formed from transmitted and received signals to a fast Fourier transformation in successive measurement cycles per radar beam, and including a modulation cycle formed from a rising and a falling modulation phase of the radar signal and a subsequent evaluation pause for received echo signals in each measurement cycle, storing the object frequencies over a number of measurement cycles, forming object tracks separated according to rising and falling modulation phases from the stored object frequencies for each target object, describing a previous time-domain behavior of the object frequencies with the object tracks, forming estimated values for the object frequencies to be expected in the next measurement cycle from a previous behavior of the object tracks, calculating an error from the object frequencies and from the estimated values obtained from the object tracks, assigning object frequency pairs having the respectively smallest error to one another after the calculation of the error, and calculating correct values for a distance and a relative speed of at least one target object from the pairs, determining and storing a data set containing distance and relative speed data for at least one target object, filtering the distance and relative speed data, determining a turn radius and a speed of the vehicle, determining which target objects are located in a lane occupied by the vehicle by using the distance and the relative speed of the target object, as well as the speed and turn radius of the vehicle, and determining at least the most dangerous target object therefrom, and alerting a driver of the vehicle if a predetermined indication threshold for the distance and the relative speed is exceeded.

2. The radar method according to claim 1, which comprises alerting the driver of the vehicle if the predetermined indication threshold for the distance and the relative speed is undershot.

3. The radar method according to claim 1, which comprises filtering the distance and the relative speed data with Kalman filtering.

4. The radar method according to claim 1, which comprises filtering the distance and the relative speed data with $\alpha$-$\beta$ filtering.

5. The radar method according to claim 1, which comprises filtering the distance and the relative speed data with $\alpha$-$\beta$-$\gamma$ filtering.

6. The radar method according to claim 1, which comprises determining a relative acceleration of the target object from the estimated values of the object frequency pairs, by exhibiting relative acceleration with the data set of the target object, filtering the relative acceleration, taking the relative acceleration into account in determining if a target object is located in the lane occupied by the vehicle, and providing an indication threshold for the relative acceleration.

7. The radar method according to claim 1, which comprises establishing warning and action thresholds for the distance and for the relative acceleration, and taking actions regarding vehicle functions if the thresholds are exceeded or undershot.

8. The radar method according to claim 7, which comprises taking actions regarding at least one vehicle function selected from the group consisting of braking, an engine throttle valve and gearshifting of the vehicle if the thresholds are exceeded or undershot.

9. The radar method according to claim 1, which comprises forming target object tracks for the distance, relative speed and relative acceleration for each target object, and no longer tracking target objects having a physically impossible behavior or disappearing target objects.

10. The radar method according to claim 1, which comprises estimating an azimuth angle of the target object from the distance, relative speed and relative acceleration, amplitudes of the object frequencies and beam number.

11. The radar method according to claim 1, which comprises taking the relative speed and the azimuth angle into account to check if the target object is located in the lane occupied by the vehicle.

12. The radar method according to claim 1, which comprises forming mean values of noise elements of the frequency spectrum formed during each Fourier transformation, subtracting the mean values from the amplitudes of the frequency spectrum, predetermining a threshold located above a remaining noise level, and further processing all maxima located above the threshold having been assigned as target objects rather than as noise.

13. The radar method according to claim 1, which comprises carrying out at least two modulation cycles in each measurement cycle, and further processing mean values of the object frequencies calculated from the modulation cycles as object frequencies of the measurement cycle.

14. The radar method according to claim 13, which comprises setting a different modulation shift for the modulation cycles per measurement cycle.

15. The radar method according to claim 13, which comprises setting a different modulation duration for the modulation cycles per measurement cycle.

16. The radar method according to claim 1, which comprises determining and storing a data set for each target object, containing at least the following data being updated after every measurement cycle if they are not constant:

distance, relative speed, relative acceleration, amplitude, chosen safety distance, tracking time or tracking counter, prediction time or prediction counter, and object status.

17. The radar method according to claim 1, which comprises adaptively deducing a driving style of the driver from steering movements, vehicle accelerations and braking decelerations initiated by the driver of the vehicle, and forming indication, warning or action thresholds for the distance, relative speed and relative acceleration corresponding thereto, initiating indication or warning signals, or operating brakes, engine throttle valve or gear shift of the vehicle if the thresholds are exceeded or undershot by dangerous or most dangerous target objects.

18. The radar method according to claim 1, which comprises comparing a noise level in the radar signals with predetermined limits for a functional check of a front end of the radar.

19. The radar method according to claim 1, which comprises feeding signals from a simulated target object into the radar signals and checking the correct processing of the signals for a functional check of the radar method.

20. A radar device for vehicles employing at least one radar beam, comprising:

a digital signal processor producing triangular-waveform digital modulation signals;

an interface module having a D/A converter converting the digital modulation signals into analog signals;

a radar front end processing the analog signals to form modulated radar signals;

at least one antenna transmitting and receiving the modulated radar signals;

a mixing and filtering device for producing mixed signals from the transmitted and received signals;

said interface module having an A/D converter converting the mixed signals into digital signals and supplying the digital signals to said signal processor for further processing;

a sensor interface for supplying signals to said signal processor;

an interface unit for supplying control signals from said signal processor to other units of the vehicle;

a control line connected from said signal processor to said radar front end for carrying digital control signals from said signal processor to control said at least one transmitting and receiving antenna; and an indication or warning device being controlled by control signals from said signal processor.

21. The device according to claim 20, wherein said indication or warning device is a visual device.

22. The device according to claim 20, wherein said indication or warning device is an audible device.

23. The device according to claim 20, including buffer memories connected between said signal processor and said interface module for the signals supplied from and to said signal processor, and a controller being separate from said signal processor, said controller controlling a radar method and a functional check, and said signal processor carrying out data processing.

24. The device according to claim 20, including another signal line connected from said radar front end to said signal processor, for reporting digital fault messages or cleaning request signals for a cover of said at least one antenna from said radar front end to said signal processor.

25. The device according to claim 20, including a recording device for storing data output from said signal processor for subsequent call-up.

* * * * *

UNITED STATES PATENT AND TRADEMARK OFFICE
CERTIFICATE OF CORRECTION

PATENT NO. : 5,633,642
DATED : May 27, 1997
INVENTOR(S) : Alfred Hoss, et al

It is certified that error appears in the above-identified patent and that said Letters Patent is hereby corrected as shown below:

On the title page, insert item [30], as follows:

-- Nov. 23, 1993 [DE]  Federal Republic of Germany........ 43 39 920--

Signed and Sealed this

Third Day of March, 1998

Attest:

BRUCE LEHMAN

*Attesting Officer*       *Commissioner of Patents and Trademarks*